United States Patent [19]

Sperber

[11] Patent Number: 5,661,801
[45] Date of Patent: Aug. 26, 1997

[54] METHOD AND APPARATUS FOR STABILIZING AND BRIGHTENING PRERECORDED TV SIGNALS ENCODED WITH COPY PROTECTION

[75] Inventor: Martin Sperber, Cranford, N.J.

[73] Assignee: HSN Marketing Inc., Boonton, N.J.

[21] Appl. No.: 388,560

[22] Filed: Feb. 14, 1995

[51] Int. Cl.⁶ ................................................ H04N 7/167
[52] U.S. Cl. .................................................... 380/15; 380/5
[58] Field of Search ............................................ 380/15, 5

[56] References Cited

U.S. PATENT DOCUMENTS

| | | | |
|---|---|---|---|
| 4,631,603 | 12/1986 | Ryan | 360/37.1 |
| 4,667,232 | 5/1987 | Long | 380/15 |
| 4,819,098 | 4/1989 | Ryan | 360/37.1 |
| 4,839,922 | 6/1989 | Imasaki et al. | 380/15 |
| 4,870,297 | 9/1989 | Karlock | 307/236 |
| 4,907,093 | 3/1990 | Ryan | 358/335 |
| 5,113,439 | 5/1992 | Hashimoto | 380/15 |
| 5,194,965 | 3/1993 | Quan et al. | 380/15 |

OTHER PUBLICATIONS

D. Dupre, *"Macrovision Stabilizer,"* Radio Electronics, Dec. 1987, pp. 49–54.

*Primary Examiner*—Stephen C. Buczinski
*Attorney, Agent, or Firm*—Darby & Darby

[57] ABSTRACT

A method and apparatus are provided for preventing the existence of pseudo-sync pulses and added AGC pulses in an original video tape with copy protection from producing a poor t.v. picture when simply played on a VCR and viewed on a t.v. monitor. In a first embodiment, the horizontal sync pulses are amplified to eliminate jitter in the signal due to confusion with the chrominance or color burst signal. Further, the color burst signal may be subject to variable gain to correct the color tint. Finally, if desired all portions of an input video signal may be amplified, except for portions of the signal where pseudo-sync pulses and added AGC pulses are normally found, in order to brighten the signal. In another embodiment, all portions of the signal are amplified and the portions of the signal corresponding to pseudo-sync pulses and AGC pulses are attenuated to their normal 1 volt peak-to-peak level. The result of the present invention is such as to reestablish the normal horizontal sync pulse to its normal level, to put the color burst in its proper ratio and to increase the video dynamic range.

25 Claims, 9 Drawing Sheets

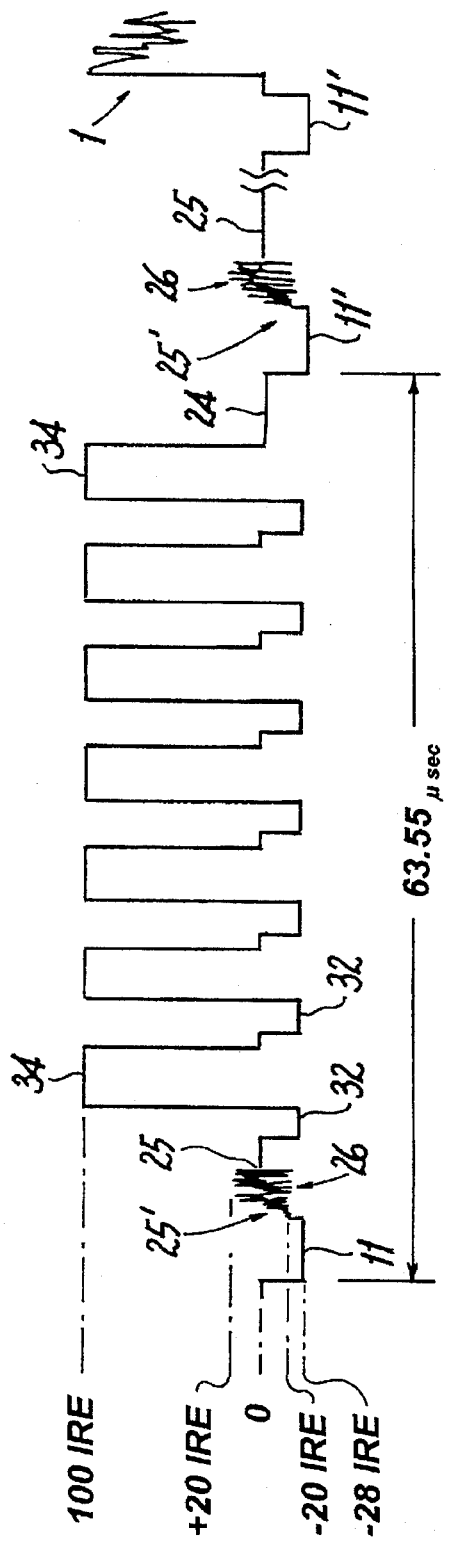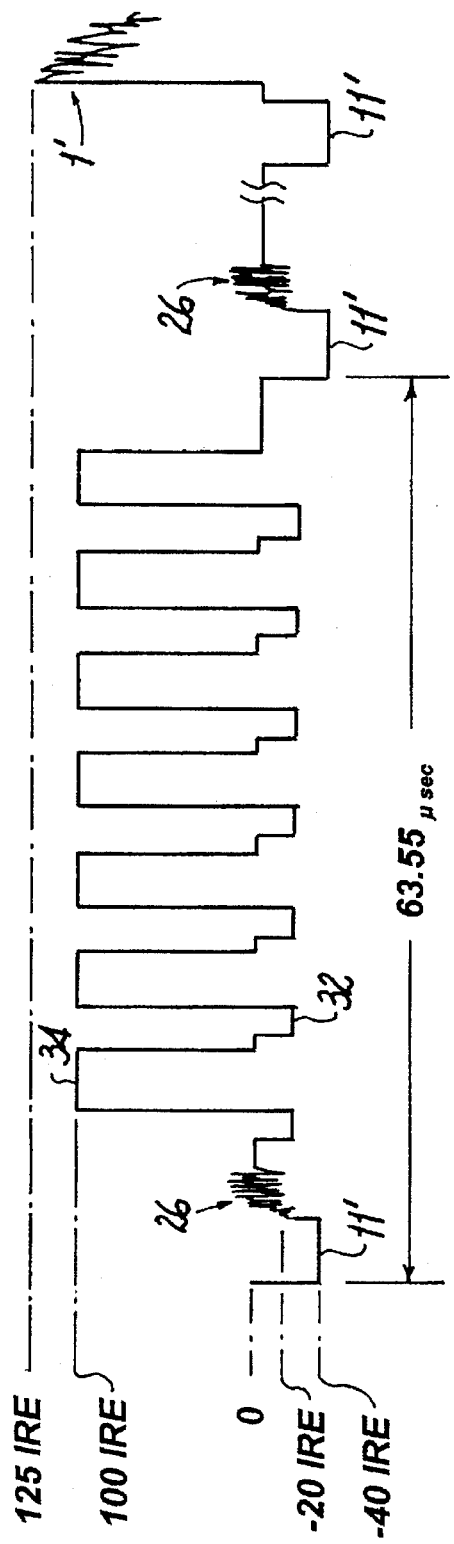

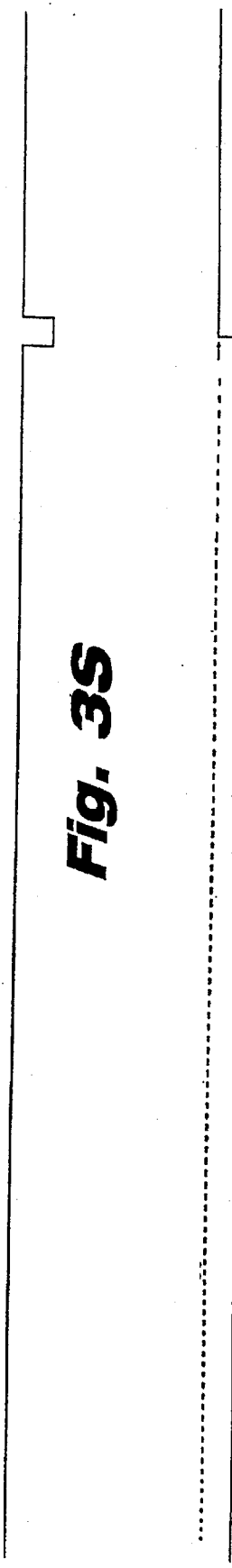
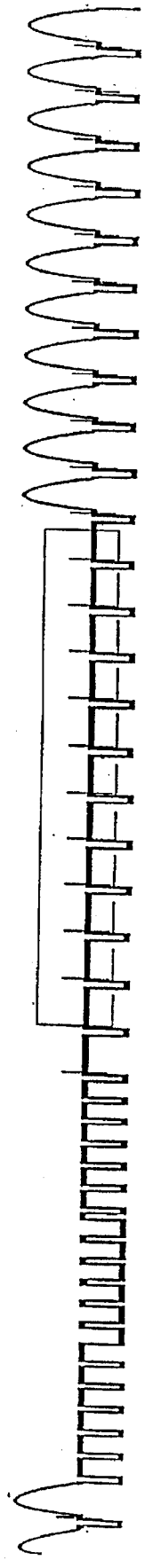
Fig. 3R
Fig. 3S
Fig. 3T
Fig. 3U

METHOD AND APPARATUS FOR STABILIZING AND BRIGHTENING PRERECORDED TV SIGNALS ENCODED WITH COPY PROTECTION

BACKGROUND OF THE INVENTION

The present invention relates to a method and apparatus for stabilizing and brightening a prerecorded TV signal that has been encoded with copy protection pulses, while still preserving those pulses. More particularly, the invention relates to a method and apparatus for providing a clear video image when viewing prerecorded tapes with copy protection by adjusting the relationships between sync pulses, color bursts and video information in a signal that has been degraded by the addition of copy protection pseudo-sync and automatic gain control (AGC) pulses that act to prevent copying of the video signal.

The producers of video tape programming have sought to limit the ability of consumers to make copies of the tapes on conventional video tape recorders ("VCR's"). The thought is that the making of such copies will reduce the market for the original tapes, i.e., through direct purchase or rental. This is not entirely correct since VCR's produce analog copies of the original signal which are always inferior to the original. Also, some copies are made merely for the purpose of legitimate time shifting. For example, if a tape is rented it must be returned in a certain period of time. If the renter did not have a chance to view it by that time, it would presumably be acceptable to make a copy, view it later and then record over it. This time shifting would have no adverse effect on the market for the original.

Early attempts to render tapes difficult to copy involved suppression of the sync pulses. The idea was that the sync pulses would be large enough to allow viewing of the tape, but the degradation in copying the tape would make the sync pulses too small to provide a stable picture when the copy was viewed. However, since VCR's and television ("t.v.") monitors have different sync sensitivities, this copy protection system failed. Sometimes it allowed acceptable copies to be made and sometimes it prevented viewing originals.

An improved system for preventing the copying of video recordings is described in U.S. Pat. No. 4,631,603 of Ryan. This patent relies on the fact that most VCR's have an automatic gain control ("AGC") circuit which sets the level of the recorded signal. This AGC circuit recognizes the difference between the sync tip and the back porch in the video signal, which are typically at IRE levels of −40 and 0, respectively. In the Ryan system, pseudo-sync pulses are added after the normal sync pulses in the twelve lines following the post equalizing period of the vertical blanking interval. These extra sync pulses cause the recording VCR to lose synchronization. Further, each pseudo-sync pulse may be followed by an AGC pulse which may vary between 0 IRE and IRE 100, i.e., 100% white level, and is located in the same relative position to the pseudo-sync as the back porch is to normal sync. These AGC pulses in the original tape act on a t.v. monitor's AGC circuit resulting in a darkened t.v. picture. Also, if this video signal is copied on to a tape in a second VCR, the recording VCR's AGC circuit assumes that the input video is very large and reduces the gain, again resulting in a darkened t.v. picture when the copied tape is played. This signal, however, is darkened more severely than when the original copy protected tape is viewed on a t.v. monitor. In one version the AGC pulses are inserted randomly, so the t.v. picture flashes light and dark. Also, all the sync pulses can be suppressed to add synchronizing instability.

The intent of the Ryan system is to provide copy protection without adversely affecting normal viewing of the original pre-recorded video tape. Unfortunately, the added pseudo-sync and AGC pulses, and the reduced sync pulses do have an adverse effect on the normal viewing of originally produced copy protected tapes, particularly on older television models. The picture may have distortions in lumination and synchronization instability, i.e., jitter or wavy lines. This has been reported in the press. See D. Dupre, *Macro-Scrubber Macrovision Stabilizer*, RADIO ELECTRONICS, December 1987, at 50.

One solution to the problem caused by these added pulses is to simply remove the unwanted pulses. U.S. Pat. No. 4,870,297 to Karlock, U.S. Pat. No. 4,695,901 to Ryan and U.S. Pat. No. 4,336,554 to Okada disclose methods and apparatus for removing these pulses by blanking the signal in the portion of VBI where they occur. However, there are reasons to retain this VBI interval unchanged, i.e. to maintain the copy protection, and to protect VITS, teletex, GCR and bilingual data that occur in the eleven line VBI interval.

SUMMARY OF THE INVENTION

It is therefore an object of the invention to eliminate the adverse effects of added pseudo-sync and AGC pulses on the viewing of original pre-recorded tapes without removing the pulses.

It is another object of the invention to improve the stability of the video picture produced by original pre-recorded, while preserving copy protected signals.

It is another object of the invention to provide a means to enhance the color quality of copy protected video signals.

In accordance with the present invention, a method and apparatus are provided for preventing the existence of pseudo-sync pulses and added AGC pulses in an original video tape with copy protection from producing a poor t.v. picture when simply played on a VCR and viewed on a t.v. monitor. In a first embodiment, all the sync pulses are amplified to eliminate jitter in the signal due to confusion with the chrominance or color burst signal. Further, the color burst signal may be subject to variable gain to correct the color tint. Finally, if it is desired to ensure undisturbed luminance, i.e., the intended range of gray scale is preserved, all portions of an input video signal may be amplified, except for portions of the signal where pseudo-sync pulses and added AGC pulses are normally found. In another embodiment, all portions of the signal are amplified and the portions of the signal corresponding to pseudo-sync pulses and AGC pulses are attenuated to their normal 1 volt peak-to-peak level. The result of the present invention is such as to reestablish the normal horizontal sync pulse to its normal IRE unit level, to put the color burst in its proper ratio and to increase the video luminance.

BRIEF DESCRIPTION OF THE DRAWINGS

The foregoing and other features of the present invention will be more readily apparent from the following detailed description of preferred embodiments taken in conjunction with the attached drawings wherein:

FIGS. 1A–1C show, respectively, a normal NTSC video signal, an NTSC signal with copy protection and a copy protected signal after processing according to the present invention;

DETAILED DESCRIPTION OF PREFERRED EMBODIMENTS

Figure 1A:
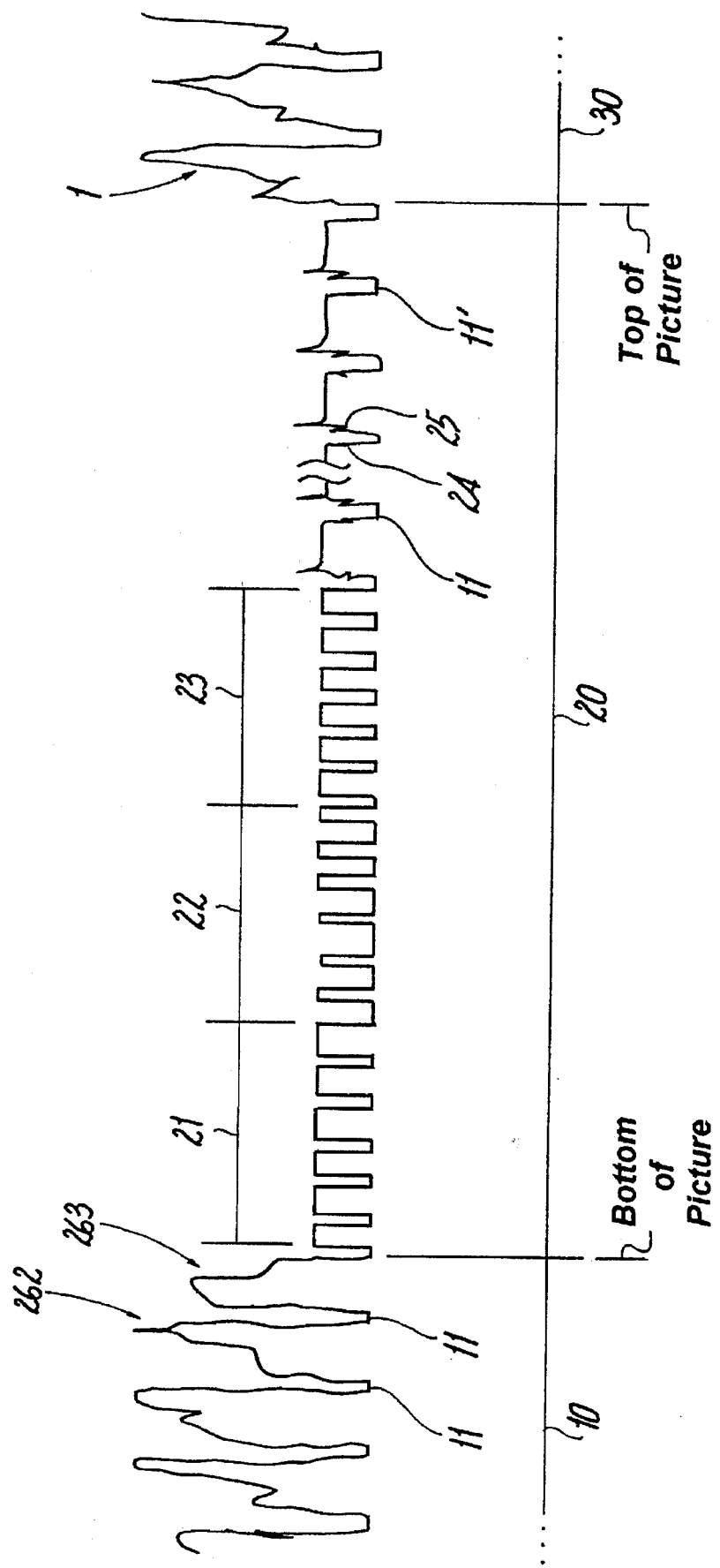

FIG. 1A shows a normal baseband t.v. video signal where white levels are toward the top of the figure and black levels are toward the bottom. Region 10 designates the video portions of the signal just before the vertical blanking interval ("VBI") 20. In region 10 each of the video lines, e.g. scan lines 262 and 263 or 524 and 525 are initiated with negative horizontal sync ("HS") pulses 11. At the beginning of the VBI there are 6 equalizing pulses 21, followed by 6 serrated vertical sync ("VS") pulses 22, which in turn are followed by 6 post equalizing pulses 23. Each of these pulses occupies one half of a line so together they account for the first nine lines of the VBI. Starting at video line 10 in the VBI there are a series of HS pulses 11', until the end of the VBI and the start of video region 30 at the first active scan line (video line 22).

Each HS pulse 11' in the VBI after video line 9 is surrounded by a front porch 24, and a back porch 25 on which a chroma or color burst signal 26 is provided, as shown more clearly in FIG. 1B.

A typical implementation of the copy protection system disclosed in U.S. Pat. No. 4,631,603 is also shown in FIG. 1B. In accordance with the teaching of the patent, pseudo-sync pulses 32 and AGC pulses 34 have been added after the HS pulses in certain lines of the VBI, e.g., lines 9 to 21. FIG. 1B shows seven pseudo-sync pulses 32 added between HS pulses 11' during line 16. However in the commercial application of this copy protection system, either incidental to this process or deliberately, the HS pulse tips are reduced from a peak norm of −40 IRE to about −28 IRE. Also, the color burst 26, is maintained at about 40 IRE and centered about 0 so it extends from −20 to +20 IRE. Since a T.V. monitor looks to the most negative signal as sync, it is clear that with the signal of FIG. 1B the monitor may be confused by the negative excursions of the color burst 26 and the HS pulses 11', 32, resulting is picture instability or jitter. Further, the compressed HS may contribute to a shift in color tint in the picture. Finally, the AGC pulses are caused to be 100% to 125% of peak white according to the '603 patent. This has the effect of suppressing the overall luminance of the active part of the video signal, i.e., region 30.

Figure 3A:
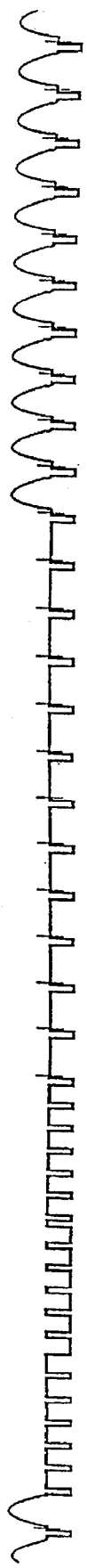
FIGS. 3A–3U illustrate output waveforms of various portions of the circuit of FIG. 2.

According to the present invention, the HS pulses are boosted back to their normal −40 IRE level. Further a control is provide which allows for a variable attenuation of the color burst. Finally, the video may be also boosted to ensure undisturbed luminance. The resulting signal is shown in FIG. 1C and 3U. It should be noted, that despite these changes to the video signal, and unlike the prior art, the pseudo-sync and AGC pulses are retained unaltered. The end result is that the video output displayed on a monitor is clarified and brightened without removing or altering the copy protection pulses.

Figure 2:
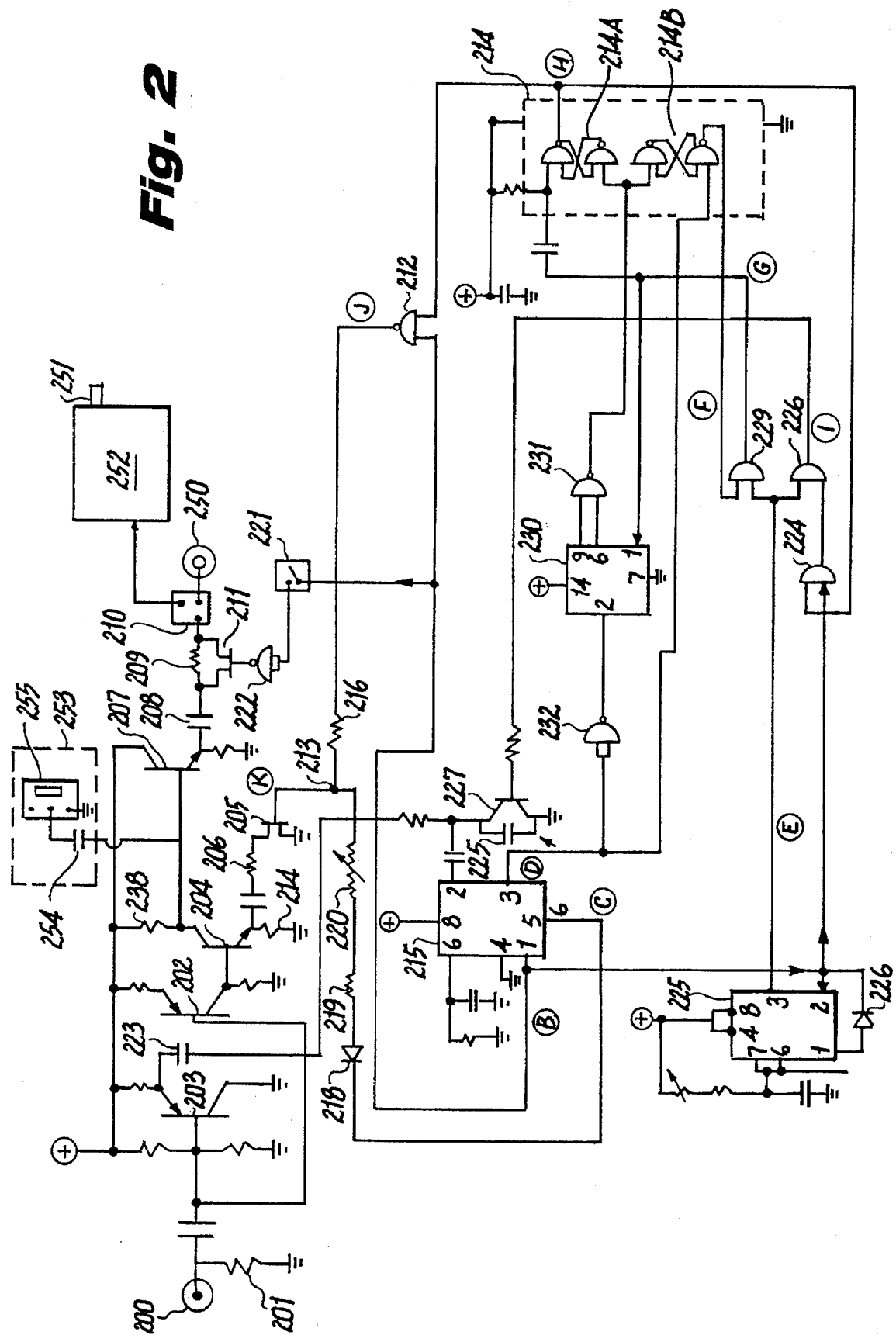
FIG. 2 is a diagram of a preferred embodiment of a circuit according to present invention.

FIG. 2 illustrates a circuit according to the invention for modifying the signal of FIG. 1B to produce the signal shown in FIG. 1C. Referring to FIG. 2, the main path for the input video signal is from input terminal 200 to output terminals 250 or 251. Terminal 200 is connected to the VCR's output, having an equivalent output impedance of 75 ohms. A matching 75 ohm resistor 201 is provided so the VCR's output voltage appears as approximately 1 volt peak-to-peak at terminal 200, as would be the case if a television or a second VCR were directly connected to the VCR's output terminal. The signal at input terminal 200 drives an inverting unity gain amplifier formed with a transistor 202 and an emitter follower amplifier formed with a transistor 203. The inverted signal at the collector of transistor 202 drives a second inverting amplifier formed with a transistor 204, which re-inverts the signal. The gain of the second inverting amplifier is varied by varying the driving voltage at the gate of a FET switch 205, which is connected to the emitter of transistor 204 through a resistor 206. The gain may be adjusted anywhere from unity, wherein FET switch 205 is off, to a 1.8 gain when FET switch 205 provides its lowest impedance.

A switchable noise filter 253 is provided at the collector of the transistor 204. The filter 253 is comprised of a capacitor 254 which has one side connected to the output of transistor 204 and the other side connected to a user operated switch 255 which selectively connects the other side to ground. The capacitor 254 is preferably sized to act as a filter with a frequency response that rolls off the passband at 6 db/octave above 2 MHz. As a result of switching the capacitor 254 into the circuit, high frequency noise is eliminated.

The signal at the collector of transistor 204 drives a transistor 207 which is arranged as an emitter-follower buffer to establish a low source impedance compared to 75 ohms. The signal at the emitter of transistor 207 passes through an AC blocking capacitor 208, a resistor 209 and a switch 210 to video output 250, or through an RF modulator 252 to output 251. Modulator 252 modulates the signal to a frequency receivable by a television. Resistor 209 is shunted by a FET switch 211, thus providing a mechanism to avoid attenuation of selected portions of the signal.

As indicated above, the gain of transistor 204 is varied using FET switch 205. The gate of FET switch 205 has a very high impedance and is driven by two sources, a NAND-gate 212 and sync separator 215, whose outputs are added together at a summing node 213. One input of NAND-gate 212 is provided by the output of one of two set/reset flip-flops 214, which may be formed by interconnecting four two-input NAND gates, i.e. flip-flop 214A. The output waveform of set/reset flip-flop 214, shown in FIG. 3H, forms a positive going window surrounding eleven lines in the vertical blanking interval (VBI) that include pseudo-sync and added automatic gain control (AGC) pulses, i.e., the lines 11 through 21, which follow the post-equalizing pulse interval 23 of the input video signal. The logic is such that when the waveform in FIG. 3H goes positive at the end of line 10 following the post-equalizing interval, the applied signal to the gate of FET switch 205 goes negative for the duration of the pulse, i.e., to the end of the 11 lines, thus turning FET switch 205 off and providing resistor 214 as the only effective source of resistance at the emitter of transistor 204. The waveform at the gate of FET switch 205 is illustrated in FIG. 3K. With resistor 214 supplying the only effective resistance, the amplifier comprised of transistor 204 provides a unity gain, thereby maintaining the 1 volt peak-to-peak output of any video component that appears during that window, including any pseudo-sync or added AGC pulses. For all other times, the waveform of FIG. 3H is low, producing a logic 1 at the gate of FET 205, thereby turning on the FET switch 205 and effectively decreasing the resistance at the emitter of transistor 204 because resistors 214 and 206 are now in parallel. In this manner, the gain of transistor 224, which is related to the ratio of the collector resistor 238 to the effective emitter resistance 214/206, is increased to 1.5–1.8, producing an output on the order of 1.5–1.8 volts peak-to-peak for all information in the field.

Within the 11 lines there exists standard horizontal sync pulses. Without doing something special, those horizontal sync pulses would remain at a reduced level relative to the 1 volt peak-to-peak signal. They would also be suppressed relative to the boosted signal outside the 11 line window. It is therefore necessary to uniquely expand the horizontal sync pulses within the 11 line interval. This is accomplished by adding a second input at NAND gate 212, i.e., a line from a sync separator 215 pin 1, which produces a signal corresponding to a composite sync signal having only horizontal and vertical sync pulses. During the last twelve lines of the VBI, the only pulses that are in the composite sync are horizontal sync pulses. Thus, when the composite signal is combined in NAND gate 212 with the VBI window from flip/flop 214A, a high signal is produced for all horizontal sync pulses gated by flip/flop 214A that occur during the VBI as illustrated in FIG. 3J. This high signal turns on FET switch 205 through resistor 216 and increases the gain of the amplifier comprised of transistor 204.

Referring now to the summing node 213 at the gate of switch 205, resistor 216 is a high impedance resistor provided in series with the output of NAND-gate 212. Resistor 216 normally does not produce any logic voltage drop since the gate of FET switch 205 has an extremely high impedance. Additionally summed at the gate node 213 is a signal from pin 5 of the sync separator 215. The information on pin 5 of sync separator 215 is the back porch pulse illustrated in FIG. 3C. This is a pulse, whose time duration surrounds the color burst information, is derived from the standard NTSC signal by the sync separator 215. The pin 5 signal is routed to a network comprising a steering diode 218, resistor 219, and a variable attenuation potentiometer (pot) 220 which can be controlled externally by a user. During the period outside of the 11 line interval controlled by the waveform illustrated in FIG. 3H, the output of NAND gate 212 is at logic 0, thus turning on FET switch 205 for the duration of the period. If the drive signal to the gate of FET switch 205 is instantaneously greater than approximately 3 volts, FET switch 205 will be fully on with its drain source impedance at its lowest. There is a region from 3 volts down to approximately 0.8 volts where the FET drain to source impedance of switch 205 starts increasing and eventually, when the gate is at 0.8 volts or less, the drain to source is essentially an open circuit. It is during this intermediate region (the ohmic region) between 3 volts and approximately 0.8 volts that the FET switch 205 is caused to act as a controlled variable resistor, rather than merely on or off in the two extreme states, thus allowing the amplifier comprising transistor 204 to provide a variable gain. By adjusting pot 220, the summing voltage at summing node 213 can be adjusted between a 3 volt high at the back porch pulse to as low as approximately 0.8 volts when it is full on. Since, as indicated above, a voltage is only applied through the network consisting of steering diode 218, resistor 219, and pot 220 during the color burst information, only this information is affected by the variation of gain. Thus the gain when the color burst is present can be set to bring the color burst signal down to its normal range with regard to a normal HS signal (FIG. 1C). Under normal NTSC conditions, the horizontal sync pulse tip is −40 IRE units in amplitude, staffing at black level. The standard color burst is also 40 IRE units in amplitude but it is centered on the black level. Therefore, the most negative extreme of the chroma signal should not be more than −20 IRE units. It has been observed that the chroma in some copy protected tapes has been expanded down to the horizontal sync tip at its compressed level by virtue of premature starting of the chroma burst at the trailing edge of sync, filling the breezeway 25', and riding up the trailing edge of sync (See FIG. 1B). This causes extreme jitter in the receiving device. In combination, it causes confusion between the horizontal sync pulse and the chroma, if it is not accurately filtered out of the sync separator in the t.v. or monitor.

It has been determined by empirical observation that changing the level of the color burst information in conjunction with a video tape that has been encoded with pseudo-sync and AGC pulses allows for the tuning of the chroma phase and therefore shifting of the tint of the chroma on a continuous basis. This is accomplished because of a phenomenon related to differential gain and differential phase in the active circuitry of both the VCR and the receiving device. By changing the level of the color burst information, a phase shift is affectively induced so as to give the user control of the coloration and the tint of the color in the final received signal as viewed on the television or monitor.

There is a second and equally important reason for being able to control the level of the chroma. As noted above, it has been determined from empirical examination of a number of tapes having added AGC and pseudo-sync pulses, that horizontal sync pulses are significantly compressed below their standard −40 IRE units as they are fed to a t.v. or a monitor when the signal is copy protected according to U.S. Pat. No. 4,631,603 of Ryan. In addition, the excursion of the color burst in the breezeway 25' goes to the level of the horizontal sync tip. This means that certain receiving devices will be confused, i.e. not be able to properly differentiate the horizontal sync from the following color burst which is of the same negative amplitude. The degree of jitter is actually statistically a function of the particular receiving device that is hooked up to the VCR and its sensitivity to this jitter. Thus the gain when the color burst is present can be set by pot 220 to bring the color burst signal down to its normal range with regard to a normal −40 IRE HS signal.

FET switch 211 is used to short out resistor 209. The gate of FET switch 211, as illustrated, is in series with a switch 221 which can be a user operated switch labeled as "H boost." The gate of FET switch 211 is driven by a composite sync signal through inverter 222 and switch 221. During all sync periods, FET switch 211 is fully on, thus resistor 209 does not attenuate the signal. When horizontal sync from sync separator 215 at pin 1, depicted in the timing diagram in FIG. 3B, goes negative, inverter 222 inverts the signal to a positive going horizontal sync tip. Once more, every time the gate of switch 211 goes positive to three volts or more, the drain-source impedance does not exceed 5 ohms, i.e. essentially a short circuit, thus the signal will not be attenuated. In sum, assuming the user has closed switch 221, the signal will not be attenuated by resistor 209 during all of the sync pulses in the field, but the remaining portions of active video will be attenuated by resistor 209. It should be noted that during the instantaneous time of horizontal and vertical sync, there is no video element, so only the sync component is affected.

Now focussing on the timing portions of the circuit, sync separator 215, which is preferably a National Semiconductor LM 1881, receives an input signal on pin 2 from the emitter of transistor 203. Separator 215 acts to separate out portions of the composite video signal, e.g. a signal corresponding to the vertical sync pulse interval of the signal on pin 3 as illustrated in the waveform of FIG. 3D. The signal corresponding to the back porch or the color burst information is provided on pin 5 as illustrated in the waveform of FIG. 3C.

Figure 3B:
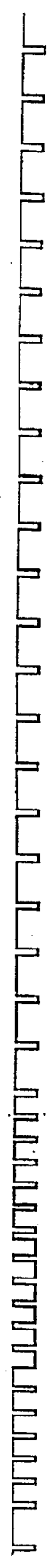
Figure 3C:
Figure 3D:

Finally, a composite sync signal, corresponding to the horizontal sync, pre-equalizing, serrated vertical, and post-equalizing pulses is generated on pin 1 of sync separator 215 as illustrated in the waveform of FIG. 3B.

Figure 3E:
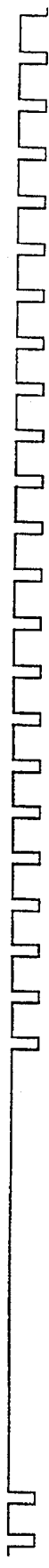
Figure 3F:

The composite sync signal from sync separator 215 pin 1 is combined in AND gate 224 with the output (FIG. 3H) from set/reset flip/flop 214A (which is preferably a CD4011, i.e., a quad two input NAND gate circuit wired as two flip flops), thus providing composite sync only during the 11 line VBI window. Retriggerable one-shot 225, which is preferably a National Semiconductor LM555CP timer, is enabled through retrigger diode 226 by the composite sync output from sync separator 215 pin 1, and provides a 50 microsecond pulse or window on pin 3 following each horizontal sync except during the pre-equalizing, vertical sync, and post-equalizing pulse intervals, illustrated by the waveform in FIG. 3E. The pulses occurring during the 9 line vertical (21, 22, 23 FIG. 1A) intervals are at a 2H rate and thus will retrigger one-shot 225 and extend its output period. The output of AND-gate 224 is gated at AND-gate 226 with the 50 microsecond pulses from pin 3 of one-shot 225, FIG. 3E, providing a signal corresponding to the waveform depicted in FIG. 3I. This signal drives transistor 227 thus shunting capacitor 228 for 50 microseconds following each of the eleven horizontal sync pulses occurring after the post-equalizing interval. Of course, this shunting prevents any signal from being detected by sync separator 215 during the indicated periods.

Figure 3G:
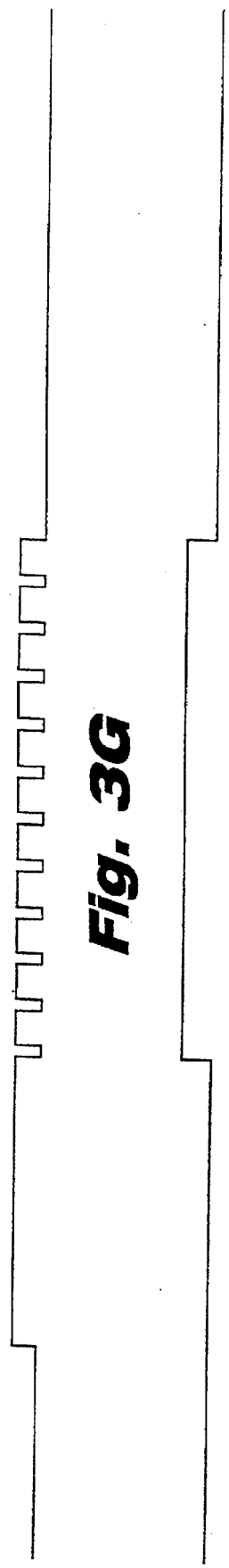
Figure 3H:
Figure 3I:
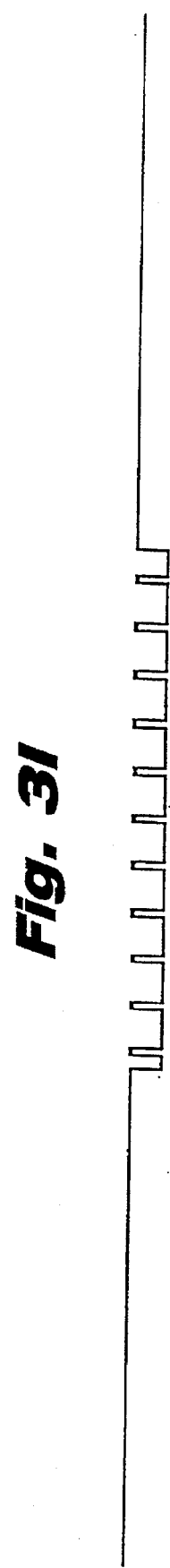
Figure 3J:
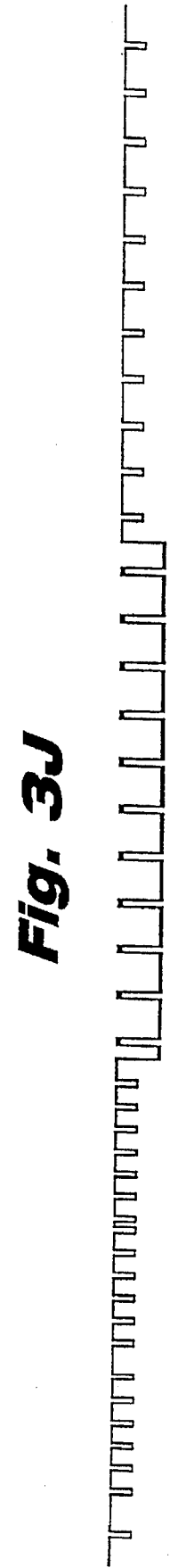
Figure 3K:
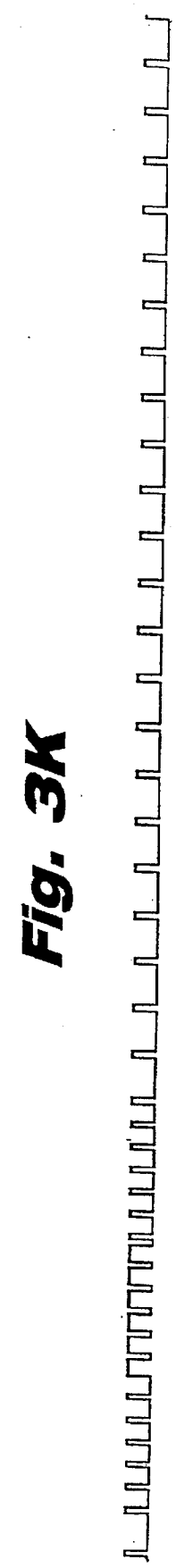

The output from pin 3 of one-shot 225 (FIG. 3E) is also combined at AND-gate 229 with the output of pin 10 of flip-flop 214B. The output of pin 10 of the flip-flop 214B is illustrated as a waveform in FIG. 3F and represents an initial timing waveform that is triggered from the leading edge of vertical sync and terminates when a counter 230, preferably a CD4024 counter, has counted 12 one shot pulses. The waveform depicted in FIG. 3G illustrates the output of AND-gate 229. The waveform in FIG. 3G is the same as the waveform of FIG. 3F except it also includes the pulses generated by the one-shot 225. The output of AND-gate 229 is fed to counter 230, which effectively counts negative transitions of pulses as triggered by the waveform of FIG. 3G, starting just prior to the first horizontal sync pulse following the post-equalizing pulse interval of the video signal. NAND gate 231 decodes the trailing edge of the twelfth one shot pulse and transmits a reset to flip-flops 214A and 214B, causing flip-flop 214A to transmit a low signal as illustrated in the waveform of FIG. 3H. Counter 230 is reset by the output on-pin 3 (FIG. 3D) of sync separator 215 which, as described above, corresponds with the vertical sync pulse interval after it has been inverted by inverter 232.

Having described the circuit, it is now easy to see that it provides a means to allow the video signal from a copy protected tape to be improved for viewing on a t.v. or monitor while leaving the pseudo-sync and added AGC pulses unchanged. However, at all other times, the amplitude of the color burst and horizontal sync pulses are adjusted to eliminate jitter and the video portion of the signal away from the copy protect pulses may be increased to ensure undisturbed luminance.

Figure 4:
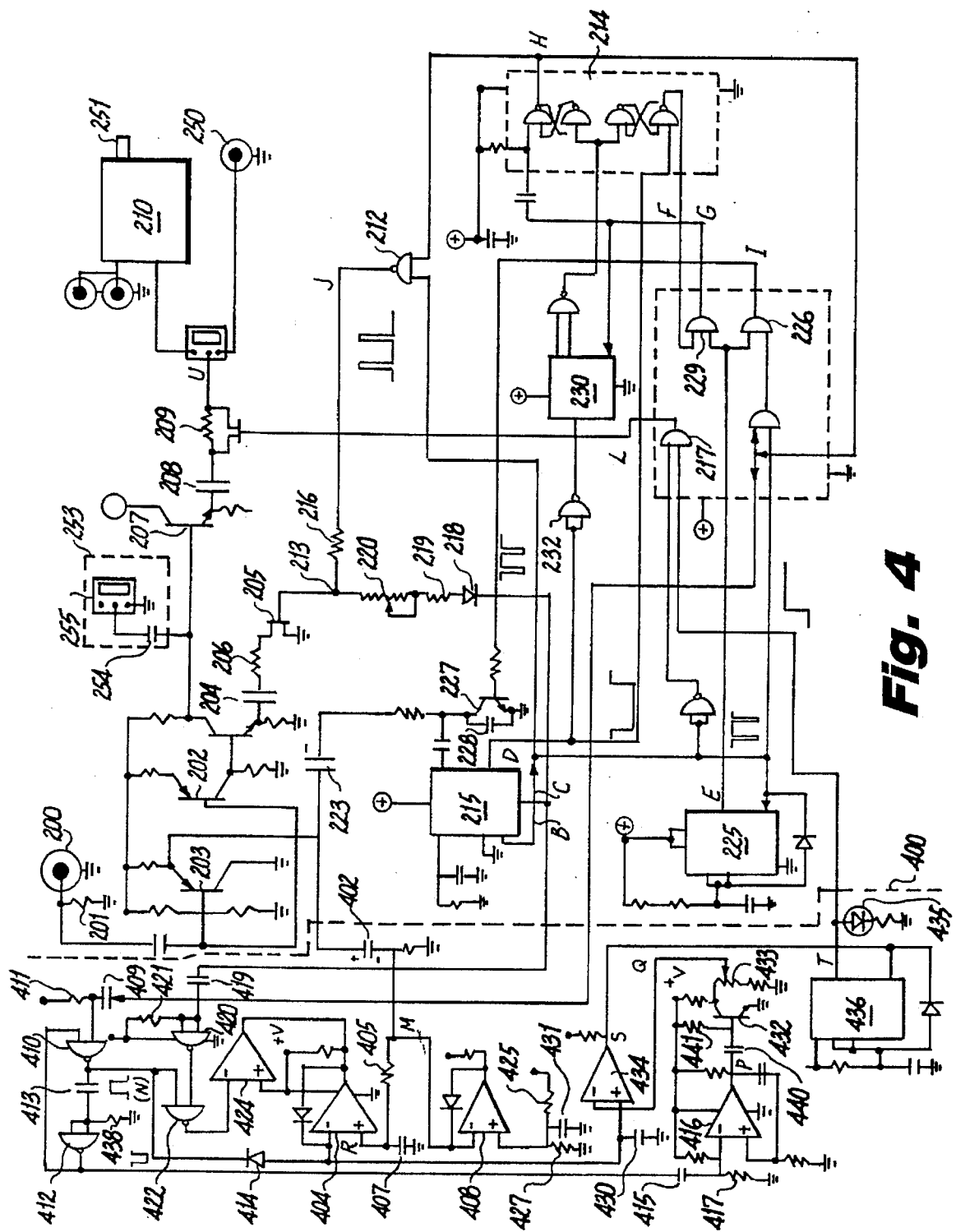
FIG. 4 is an enhanced embodiment of the circuit of FIG. 2.

FIG. 4 illustrates an enhanced embodiment of the present invention. Where the embodiment illustrated in FIG. 2 required a user to close switch 221 to provide for the correction of the horizontal sync pulse level, the enhanced embodiment includes a means to automatically detect and correct the horizontal sync level.

The arrangement shown in FIG. 4 has a vertical dotted line 400. The portion of the circuitry to the right of the dotted line 400 is substantially the same that shown in FIG. 2 and operates in the same fashion. The portion to the left of the dotted line represents the automatic suppressed horizontal sync pulse detection circuitry.

As illustrated, the composite video from the emitter of transistor 203 is provided through a blocking capacitor 402 to the positive input of a comparator circuit 404, preferably an LM311N, through a network comprised of resistor 405 and capacitor 407. The composite video signal is also applied to the negative input of comparator 408, which preferably is part of an LM339N.

Figure 3L:
Figure 3M:
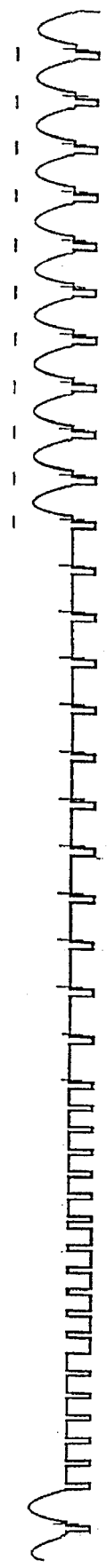
Figure 3N:

The signal shown in FIG. 3H is applied through a network formed by capacitor 409 and resistor 411 to one input of NAND-gate 410. The output of NAND-gate 410 is applied through a network comprised of capacitor 413 and resistor 438. Both inputs of NAND-gate 412 are connected together and to ground through resistor 438. In turn, the output of NAND-gate 412 is applied to the other input of NAND-gate 410. The gates 410 and 412, and the accompanying components, form a monostable multivibrator that is triggered by the signal shown in FIG. 3H, with a resulting pulse or window at the output of NAND-gate 412 that is approximately eight lines in width as illustrated in the signal shown in FIG. 3N. As one skilled in the art understands, the duration or width of the pulse shown in FIG. 3N is determined by the values of the capacitor 413 and the resistor 438. The outputs of the monostable formed by NAND-gates 410 and 412 form a window around several active video lines after the VBI.

Figure 3O:

The back porch pulse output from pin 5 of sync detector 215 (FIG. 3C) is supplied through a differentiation network consisting of capacitor 419 and resistor 421 to the inputs of a NAND-gate inverter 420. The differentiation network narrows the back porch. The narrowed back porch output of inverter 420 and the output of NAND-gate 410 are combined in NAND-gate 422. The output of NAND-gate 422, illustrated in FIG. 3O, is the narrowed back porch pulse train for eight lines of video. The eight line back porch pulse train is applied to the negative input of comparator 424. This comparator 424 is used as an inverter and is wired to comparator 404 such that the circuit acts as a gated peak sync detector where inverter 424 holds the output of circuit 404 off until the narrowed back porch signals occur. Because of the timing generated in NAND-gate 420, this peak detector is effective to measure sync level in the eight lines after the VBI and copy protection pulse signals. Thus it measures the amplitude of horizontal sync in the active video region 30 of FIG. 1A following the VBI. Comparator 408 acts as a sync clamp at 1.27 volts—the value at the positive input developed by a resistor divider comprising resistors 425 and 427—and is filtered by capacitor 431. The clamped signal is illustrated in FIG. 3M.

Figure 3P:
Figure 3Q:

A window pulse from gate 412, the inverted version of the signal illustrated in FIG. 3N, is applied to the negative input of an amplifier 416 through a capacitor 415, which amplifier is arranged as a monostable one-shot. The amplifier 416 produces a 260 μs pulse, illustrated in FIG. 3P, that is passed through a 27 μsec pulse shaping network comprising capacitor 440, resistor 441, and a transistor 432. A variable resistance 433 is used to set the amplitude of this reference pulse, FIG. 3Q, which is applied to the negative input of comparator 434, with the sampled peak signal, FIG. 3R, being applied to the positive input of comparator 434. Based on this comparison, a signal as illustrated in FIG. 3S is produced at the output of the comparator 434 whenever the sync pulse in the active video is less than the value set by resistance 433. This pulse triggers a retriggerable monostable 436, preferably an NE556N, whose output, which is illustrated in FIG. 3T, is applied to gate 217 to provide the horizontal sync boost as described with reference to FIG. 2. The waveform from gate 217 is illustrated in FIG. 3L. It also causes a front panel light 435 to light as an indication that sync boost is taking place. The delay of monostable 436 is such that it is retriggered before it can time out as long as the horizontal sync pulses are detected as being suppressed below a normal value.

Figure 5:
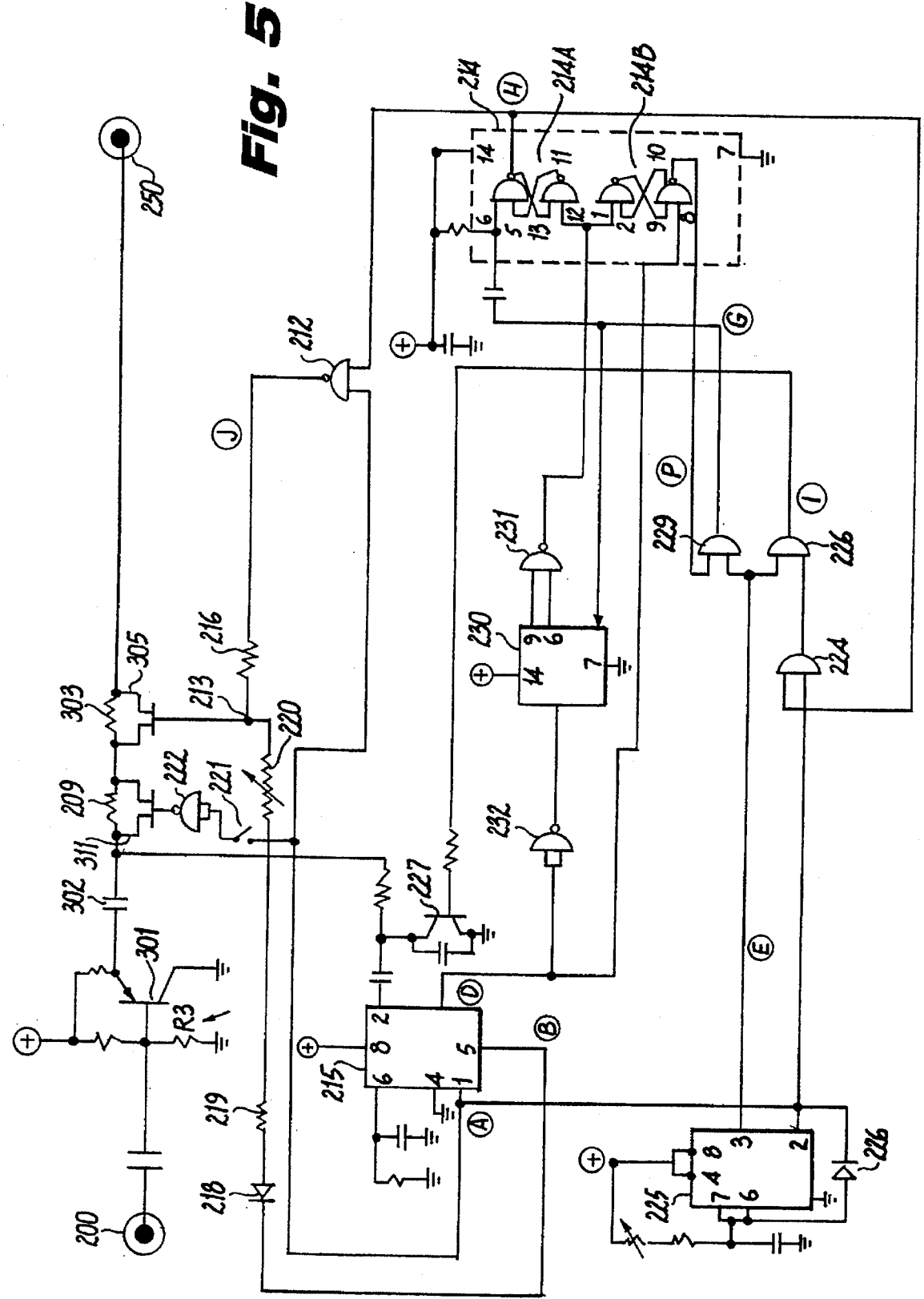
FIG. 5 is another embodiment of the present invention.

FIG. 5 illustrates a third embodiment of the present invention operating in a different manner from that of the embodiment of FIG. 2. In FIG. 5, the entire signal is amplified and then the portions of the signal corresponding to pseudo-sync and added AGC pulses are attenuated to their normal level, that is, 1 volt peak-to-peak. Referring to FIG. 5, the main path for the input video signal is from input terminal 200 to output terminal 250. Terminal 200 is connected to the output of a VCR, the VCR having an equivalent output impedance of 75 ohms. The signal at input 200 drives an emitter follower amplifier comprised of a transistor 301, whose input impedance is substantially higher than 75 ohms. Normally, when the VCR is directly connected to a television monitor, the television monitor has an equivalent input impedance of 75 ohms, thus the voltage at terminal 200 would appear as 1 volt peak-to-peak. However, since the emitter follower amplifier 301 has an input impedance substantially higher than 75 ohms, the VCR's output voltage is not substantially terminated and appears as approximately 2.0 volts peak-to-peak at terminal 200.

The transistor 301 provides the 2.0 volt peak-to-peak low impedance signal at its emitter, which feeds two series resistors 209 and 303, together having approximately a 75 ohm impedance, which are connect to the output video jack 250. Video jack 250 is normally terminated with a device that has a 75 ohm input impedance, e.g., a t.v. monitor. The two series resistors 209 and 303 are so fashioned that when terminated with the normal 75 ohm device, they form a 2 to 1 attenuator providing 1 volt peak-to-peak to the output load. Each of the two resistors is shunted by a video switch in the form of FETs 311,305, respectively. When both switches are off, the approximate 2 to 1 attenuation is preserved and the incoming signal appears as a 1 volt peak-to-peak signal at output 250. The remaining portions of the circuit operate in an identical fashion as the corresponding elements of FIG. 2, with FET switch 311 driven in the same manner as FET switch 211 of FIG. 2 and FET switch 305 being driven in the same manner as FET switch 205 of FIG. 2.

While the present invention has been particularly shown and described with reference to preferred embodiments thereof, it will be understood by those skilled in the art that various changes in form and details may be made therein without departing from the spirit and scope of the invention.

What is claimed is:

1. Apparatus for stabilizing a copy protected composite video signal including video portions, compressed horizontal sync pulses, color burst signals and at least some copy protection pulses, comprising:

a signal detecting circuit, the signal detecting circuit detecting the occurrence of the compressed horizontal sync pulses and the copy protection pulses; and a variable gain amplifier responsive to the detecting circuit, the amplifier amplifying the compressed horizontal sync pulses at a first amplification factor and the copy protection pulses at a second amplification factor of unity gain, such that in an amplified output signal of the amplifier the horizontal sync pulse tips are amplified by a first amplification factor to be significantly more negative than the color burst signal, and the copy protection pulses are amplified by the second amplification factor.

2. The apparatus of claim 1 further including means for variably adjusting the peak-to-peak amplitude of the color burst signal to stabilize color tint.

3. The apparatus of claim 2 wherein the amplifying means further includes means for amplifying the video portions and the color burst signals of the composite video signal, without effecting the copy protection pulses, prior to adjusting the peak-to-peak amplitude of the color burst signal.

4. Apparatus for stabilizing a copy protected composite video signal including vertical blanking interval portions and active video portions, the vertical blanking interval portions and the active video portions having video sync pulses and color burst signals, the vertical blanking interval having a portion with at least some copy protection pulses, comprising:

a detector which detects video sync pulses; and a variable gain amplifier which is responsive to the detector and produces an output signal in which the video sync pulses and the color burst signals are amplified at a first amplification factor and the copy protection pulses are amplified at a second amplification factor of unity gain.

5. The apparatus of claim 4 further comprising:

a filter selectively in communication with the amplifier for filtering noise from the amplified signal.

6. The apparatus of claim 4 wherein said detector comprises:

a sync separator which separates the composite video signal into a composite sync signal and a signal corresponding to a vertical sync pulse interval;

a clock signal generator which is responsive to the composite sync signal and generates a clock signal having pulses related to horizontal sync pulses;

a resettable counter which is responsive to the clock signal generator and the sync separator, said resettable counter counting clock signal pulses and generating a signal related to the start of the vertical blanking interval, said resettable counter being reset by the signal corresponding to the vertical sync pulse interval; and a window signal generator which generates a window signal related to a portion of the vertical blanking interval, said window signal controlling the amplifier such that it does not amplify the composite signal during the region of the vertical blanking interval that contains the copy protection signals.

7. The apparatus of claim 6 wherein said sync separator further separates the composite video signal into a back porch signal corresponding to a portion of the composite video signal surrounding the color burst signal, said back porch signal controlling the amplifier such that it amplifies the composite signal during the portion that contains the color burst signals.

8. The apparatus of claim 7 further including a means for variably controlling the amplitude of the back porch signal to vary the amplification of the color burst signals.

9. The apparatus of claim 4 further comprising:

a modulator in communication with said amplifying means, said modulator modulating the output signal to a frequency receivable by a television.

10. The apparatus of claim 4 wherein:

the video sync pulses comprise compressed horizontal sync pulses, serrated vertical sync pulses, pro-equalizing pulses, and post-equalizing pulses; and the copy protection pulses comprise pseudo-sync pulses and automatic gain control pulses.

11. The apparatus of claim 10 further comprising:

a level detector which detects the signal level of at least some of the compressed horizontal sync pulses;

a comparator which compares the detected signal level to a certain level and produces a boost signal when the detected signal is less than the certain level; and attenuation means receiving the amplified signal and responsive to the boost signal from the comparator for setting the signal level of the compressed horizontal sync pulses to a predetermined level.

12. The apparatus of claim 4 further comprising:

a filter selectively connected to the amplifying means for filtering noise from a signal at an output of the amplifying means.

13. An apparatus for stabilizing a composite video signal having active video portions and vertical blanking interval portions, the active video portion and the vertical blanking interval portion having normal video sync pulses and color burst signals, copy protection pulses having an original level being located in a portion of the vertical blanking interval, comprising:

means for amplifying the composite video signal to produce an amplified composite video signal;

means for detecting normal video sync pulses in the composite video signal; and attenuation means receiving the amplified composite video signal and being responsive to the detection means for attenuating portions of the amplified composite video signal in the vertical blanking interval that includes the copy protection pulses so that such protection pulses return to their original level in the composite video signal.

14. The apparatus of claim 13 wherein the means for detecting normal video sync pulses comprises:

a sync separator means for separating the composite video signal into a composite sync signal and a signal corresponding to a vertical sync pulse interval;

a clock signal generating means responsive to the composite sync signal for generating a clock signal having pulses related to horizontal sync pulses;

a resettable counter means responsive to the clock signal generating means and the sync separator means, for counting clock signal pulses and for generating a signal related to the vertical sync pulse interval, the resettable counter means being reset by the signal corresponding to the vertical sync pulse interval; and a window signal generating means for generating a signal related to the vertical blanking interval for controlling the attenuation means, said window signal controlling the attenuation means such that it attenuates portions of the composite signal during portions of the vertical blanking interval.

15. The apparatus of claim 13 further comprising:

an attenuation control means, communicatively connected to the attenuation means, for controlling a level of attenuation of the attenuation means in response to the detection means.

16. The apparatus of claim 13 further including means for variably attenuating the amplitude of the color burst signal to stabilize color tint.

17. Apparatus for stabilizing a copy protected video signal including active video portions and vertical blanking interval portions, the active video portion and the vertical blanking interval portions having horizontal sync pulses, copy protection signals being located in the vertical blanking interval portions after horizontal sync pulses comprising:

horizontal sync detecting means for detecting the horizontal sync pulses;

vertical blanking interval detecting means for detecting the vertical blanking interval portions; and amplifying means responsive to the horizontal detecting means and the vertical blanking interval detecting means, for amplifying all portions of the copy protected video signal except portions in the detected vertical blanking interval portions following at least some of the detected horizontal sync pulses where the copy protection signals are located.

18. The apparatus of claim 17 wherein the video signal includes color burst signals which begin at the trailing edge of horizontal sync and further comprising means for variably adjusting the peak-to-peak amplitude of the color burst signal to stabilize color tint.

19. The apparatus of claim 17 further comprising:

a filter selectively connected to the amplifying means for filtering noise from a signal at an output of the amplifying means.

20. The apparatus of claim 17 further comprising:

means for detecting the signal level of at least some of the horizontal sync pulses;

comparing means for comparing the detected signal level to a predetermined level; and attenuation means receiving the amplified signal and responsive to the comparing means for adjusting the signal level of the horizontal sync pulses to at least the predetermined level.

21. Apparatus for stabilizing a copy protected composite video signal including video portions, vertical blanking intervals, horizontal sync pulses, color burst signals and at least some copy protection pulses in a portion of the vertical blanking interval, comprising:

sync detector which detects the occurrence of vertical blanking intervals and horizontal sync pulses; and a gain controller which controllably increases its gain so that at an output of said gain controller the original amplitude of the composite video signal increases to a new amplitude, except between selected horizontal sync pulses in the vertical blanking interval in which copy protection pulses occur.

22. The apparatus according to claim 21 further comprising:

a gain varying means responsive to the sync detector and receiving the signal at the output of the gain controller for causing a signal at an output of said gain varying means to increase the size of the horizontal sync pulses.

23. The apparatus according to claim 22 further comprising:

means for detecting the signal level of at least some of the horizontal sync pulses;

comparing means for comparing the detected signal level to a predetermined level; and means responsive to the comparing means and receiving the amplified signal for causing said gain varying means to conform the horizontal sync pulses to a predetermined level.

24. The apparatus according to claim 21 wherein said sync detector comprises:

a sync separator means for separating the composite video signal into a composite sync signal and a signal corresponding to a vertical sync pulse interval;

a clock signal generating means responsive to the composite sync signal for generating a clock signal having pulses related to horizontal sync pulses;

a resettable counter means responsive to the clock signal generating means and the sync separator means, for counting clock signal pulses and for generating a signal related to the vertical sync pulse interval, the resettable counter means being reset by the signal corresponding to the vertical sync pule interval; and a window signal generating means for generating a signal related to the vertical blanking interval for controlling the gain of the gain controller, said window signal controlling the amplifier such that it does not amplify the composite signal during the region of the vertical blanking interval that contains the copy protection signals.

25. The apparatus according to claim 21 further comprising:

a filter selectively connected to the gain controller for filtering noise from a signal at an output of the gain controller.

* * * * *